D. N. Ropes,
Attaching Handles to Knives.
N°10,275. Patented Nov. 29, 1853.
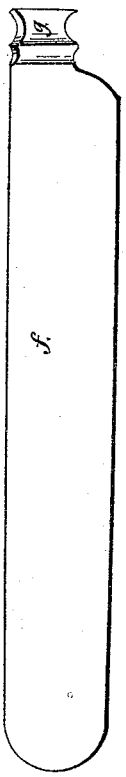
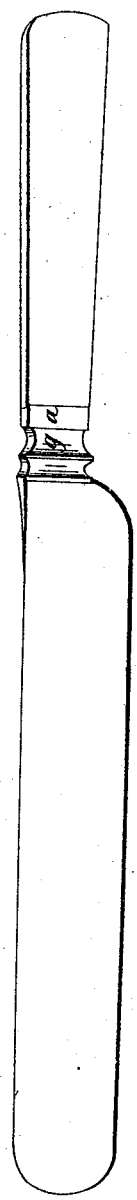
Inventor:
David N. Ropes

UNITED STATES PATENT OFFICE.

DAVID N. ROPES, OF MERIDEN, CONNECTICUT.

ATTACHING HANDLES TO THE BLADES OF TABLE-KNIVES.

Specification of Letters Patent No. 10,275, dated November 29, 1853.

*To all whom it may concern:*

Be it known that I, DAVID N. ROPES, of Meriden, county of New Haven, and State of Connecticut, have invented a new and useful improvement in methods of fastening handles made of ivory, bone, horn, wood, or other similar material to the blades of table knives and forks, applicable also to other handles, of which I hereby declare the following to be a clear and full description, reference being had to the accompanying drawings, which make a part of this specification.

In the drawing the same letters in different figures represent the same parts.

Figure 1 represents a cap, made of German silver, or other suitable metal, with a hole through the center of its top, of a suitable size to receive the screw $e$, Fig. 6.

Fig. 2 represents a handle with a shoulder cut on its end at $b$, of a suitable size to receive and fit tightly in to the cap $a$, Fig. 1. A hole is drilled into the center of the handle at $c$ and a thread cut in it of a size and depth suitable to receive the screw $e$, Fig. 6.

Fig. 3 represents a handle with the cap $a$ secured to it by means of the screw $e$. The head of the screw is countersunk into the top of the cap $a$ so as to be flush with its surface as shown in Fig. 3.

Fig. 4 represents the blade of a table knife, with a bolster $g$ corresponding in size to the cap $a$ on the handle $d$, Fig. 3. The end of the bolster is filed off flush to match the top of the cap $a$, Fig. 3.

The handle and blade prepared as above described are then to be placed together in their proper position and soldered, with any of the amalgams generally used for the purpose of uniting two metallic bodies and possessing sufficient strength to answer the purpose. The parts around the joint are then to be finished in the usual way.

Fig. 5 represents a knife put together by my improved method.

I do not intend to confine myself to any particular shape or style of cap, nor to the particular method of uniting the various parts by means of the screw and solder as above described. The cap may be made in an almost infinite variety of forms, from a plain disk of metal to an elaborate and highly ornamental design, and the various parts may be united by dove-tailing, riveting, or any other mechanical means well known to artisans, having the shape of the various parts at the point of union so arranged as to admit of this being done. Nor do I wish to be understood as claiming the exclusive right of soldering or brazing metallic handles on to the blades of knives and forks, nor of uniting handles made of other materials in the ordinary way to the bolsters of table knife and other blades by mechanical means for both of these have heretofore been done.

What I do claim as my invention, and desire to secure by Letters Patent, is—

The use of the metallic cap interposed between the handle and the blade of the knife or fork and secured to each substantially in the manner above described.

In witness whereof I have hereunto set my hand this 15th day of October A. D. 1853.

DAVID N. ROPES.

Witnesses:
JULIUS IVES, Jr.,
A. C. WETMORE.